United States Patent
Cho et al.

(10) Patent No.: US 9,971,191 B2
(45) Date of Patent: May 15, 2018

(54) LIQUID CRYSTAL DISPLAY COMPRISING QUANTUM DOT SHEET AND COLOR GAMUT ENHANCING FILM

(71) Applicant: SKC HI-TECH & MARKETING CO., LTD., Chungcheongnam-do (KR)

(72) Inventors: Hong Youl Cho, Chungcheongnam-do (KR); Kyoo Choong Cho, Gyeonggi-do (KR); Hyun Cheol Nam, Chungcheongnam-do (KR)

(73) Assignee: SKC HI-TECH & MARKETING CO., LTD., Chungcheongnam-Do (KR)

( * ) Notice: Subject to any disclaimer, the term of this patent is extended or adjusted under 35 U.S.C. 154(b) by 0 days. days.

(21) Appl. No.: 15/407,601

(22) Filed: Jan. 17, 2017

(65) Prior Publication Data
US 2017/0205664 A1    Jul. 20, 2017

(30) Foreign Application Priority Data
Jan. 20, 2016 (KR) .................. 10-2016-0006744

(51) Int. Cl.
*G02F 1/13357* (2006.01)
*G02F 1/1335* (2006.01)
*F21V 8/00* (2006.01)

(52) U.S. Cl.
CPC ....... *G02F 1/133514* (2013.01); *G02B 6/005* (2013.01); *G02B 6/0053* (2013.01);
(Continued)

(58) Field of Classification Search
CPC ...... G02B 5/003; G02B 6/005; G02B 6/0051; G02B 6/0053; G02B 6/0055; G02F 1/1335–1/1336; G02F 1/133514; G02F 2001/133614; G02F 2202/2836; G02F 2201/08; G02F 2202/04; G02F 2203/055; Y10T 428/1041

See application file for complete search history.

(56) References Cited

U.S. PATENT DOCUMENTS

| | | | |
|---|---|---|---|
| 6,849,327 B1 | 2/2005 | Ikuhara et al. | |
| 2009/0002620 A1* | 1/2009 | Yamashita | C08F 297/026 349/137 |

(Continued)

FOREIGN PATENT DOCUMENTS

| | | |
|---|---|---|
| CN | 1355891 A | 6/2002 |
| CN | 103676288 A | 3/2014 |

(Continued)

OTHER PUBLICATIONS

Office Action dated Dec. 5, 2017, issued in the corresponging Japanese Patent Application No. 2016-241605.
(Continued)

*Primary Examiner* — Sophie Hon
(74) *Attorney, Agent, or Firm* — Harness, Dickey & Pierce, P.L.C.

(57) ABSTRACT

The present invention relates to a liquid crystal display comprising a quantum dot sheet and a color gamut enhancing film, wherein the liquid crystal display of the present invention can improve a color gamut by transmitting pure RGB (red, green, and blue) wavelengths emitted from a light source as much as possible and absorbing unnecessary wavelengths other than the RGB wavelengths.

9 Claims, 3 Drawing Sheets

(52) U.S. Cl.
CPC ...... *G02F 1/133528* (2013.01); *G02B 6/0051* (2013.01); *G02B 6/0055* (2013.01); *G02F 2001/133614* (2013.01); *G02F 2201/08* (2013.01); *G02F 2202/04* (2013.01); *G02F 2202/28* (2013.01); *G02F 2202/36* (2013.01); *G02F 2203/055* (2013.01)

(56) References Cited

U.S. PATENT DOCUMENTS

| | | | |
|---|---|---|---|
| 2012/0113672 A1* | 5/2012 | Dubrow | B82Y 20/00 |
| | | | 362/602 |
| 2014/0119049 A1 | 5/2014 | Kim et al. | |
| 2015/0109814 A1* | 4/2015 | Chen | G02B 6/005 |
| | | | 362/606 |
| 2015/0368553 A1 | 12/2015 | Nelson et al. | |
| 2016/0161801 A1* | 6/2016 | Watano | G02B 5/201 |
| | | | 349/71 |

FOREIGN PATENT DOCUMENTS

| | | | |
|---|---|---|---|
| JP | 2010-134349 | 6/2010 | |
| KR | 10-2013-0123718 | 11/2013 | ............... G02B 5/02 |
| KR | 10-2014-0056490 | 5/2014 | ......... G02F 1/13357 |
| TW | 201432020 A | 8/2014 | |
| WO | WO 2015/098906 | 7/2015 | |

OTHER PUBLICATIONS

Office Action from corresponding Taiwan Patent Application No. 106101864, dated Mar. 8, 2018.

* cited by examiner

LIQUID CRYSTAL DISPLAY COMPRISING QUANTUM DOT SHEET AND COLOR GAMUT ENHANCING FILM

CROSS-REFERENCE TO RELATED APPLICATIONS

This U.S. patent application Ser. No. 15/407,601, filed on Jan. 17, 2017, claims the benefit and priority of Korean Patent Application No. 10-2016-006744, filed Jan. 20, 2016. The entire disclosures of the applications identified in this paragraph are incorporated herein by reference.

FIELD

The present invention relates to a liquid crystal display in which an enhancement of color gamut is maximized by comprising a quantum dot sheet and a color gamut enhancing film.

BACKGROUND

In the past, 40-inch (") class TVs were prevalent, but many consumers now purchase 50" class TVs and even 60" class TVs. While the size competition was over, resolution competition has begun. Even a year ago, full high definition (FHD) class TVs belonged to an advanced model, but ultra HD (UHD) TVs now have been rapidly spread on the market.

Recently, the display market has evolved from large-area, high-resolution competition to color competition. For this reason, competition for the production of a display with excellent color has recently emerged.

A liquid crystal display displays an image by using optical properties of liquid crystals, wherein, since a liquid crystal panel displaying the image is a non-emissive device or not self-luminous, the liquid crystal display has a structure comprising the liquid crystal panel as well as a back-light unit which is disposed on a rear surface of the liquid crystal panel to provide light to the liquid crystal panel. Although the liquid crystal display is in the spotlight as a display device used in mobile devices, computer monitors, and high-definition televisions (HDTVs), the liquid crystal display is somewhat inferior to other types of displays in terms of color.

Recently, the employment of a quantum dot sheet comprising quantum dot particles shows the best performance among various solutions proposed for realizing a high-quality color reproduction display (see Korean Patent Application Laid-open Publication Nos. 2014-056490 and 2013-123718). However, under the circumstances that a picture quality standard has been changed for UHD broadcast, a high-quality color reproduction level achievable by the quantum dot sheet is insufficient for the standard. Specifically, the quantum dot sheet may satisfy 100 percent a standard for HD TV (i.e., BT.709), or a standard for digital cinema (i.e., DCI-P3), but only reaches a level of 70% to 80% of BT.2020 as a new standard for UHD TV.

Thus, there is a need to develop a new technique which may dramatically improve a color gamut of a conventional LCD to the level of the new standard.

DISCLOSURE OF INVENTION

Technical Problem

An object of the present invention is to provide a liquid crystal display which may maximize an enhancement of color gamut of the liquid crystal display by transmitting pure RGB (red, green, blue) wavelengths emitted from a light source as much as possible and blocking unnecessary wavelengths other than the RGB wavelengths.

Solution to Problem

To achieve the above object, the present invention provides a liquid crystal display comprising a backlight unit and a liquid crystal panel,
wherein the backlight unit comprises a quantum dot sheet comprising quantum dot particles, and the backlight unit, the liquid crystal panel, or both of the backlight unit and the liquid crystal panel comprise at least one coating layer or adhesive layer, wherein the at least one coating layer or adhesive layer comprises at least one type of an absorption dye configured to absorb a specific wavelength band.

Advantageous Effects

According to the present invention, since at least one type of an absorption dye configured to absorb a specific wavelength band is introduced into an adhesive layer or a coating layer of a liquid crystal display and a quantum dot sheet is comprised in the liquid crystal display, a color gamut can be enhanced by transmitting pure red, green, and blue (RGB) wavelengths emitted from a light source as much as possible and blocking unnecessary wavelengths other than the RGB wavelengths, and thus, it is possible to manufacture a liquid crystal display in which the enhancement of the color gamut is maximized.

BEST MODE FOR CARRYING OUT THE INVENTION

A liquid crystal display of the present invention comprises a backlight unit and a liquid crystal panel, wherein the backlight unit comprises a quantum dot sheet comprising quantum dot particles, and the backlight unit, the liquid crystal panel, or both of the backlight unit and the liquid crystal panel comprise at least one coating layer or adhesive layer in configurations thereof, wherein the at least one coating layer or adhesive layer comprises at least one type of an absorption dye configured to absorb a specific wavelength band.

Figure 1:
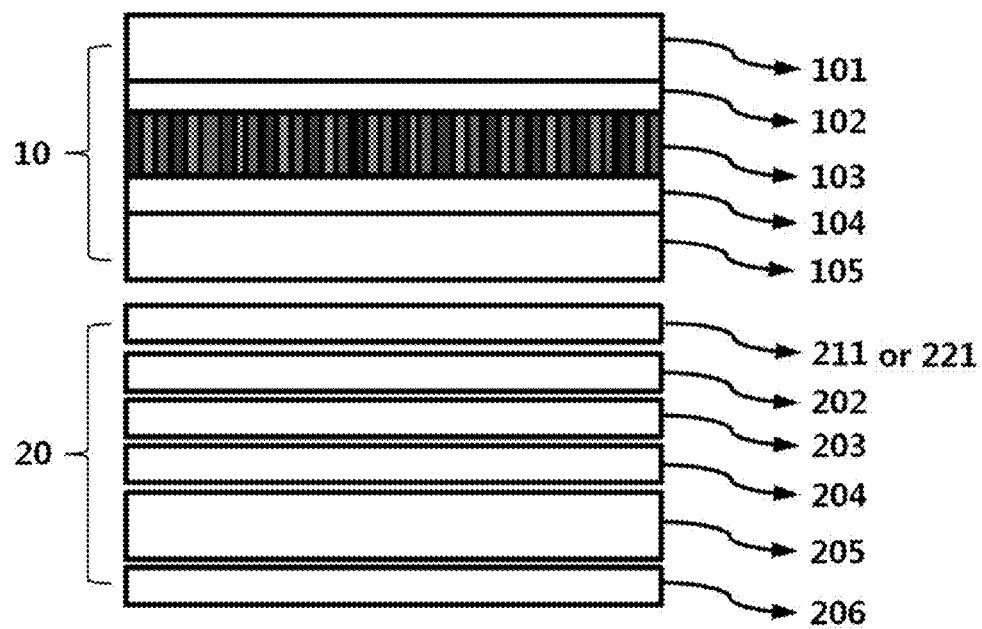
FIG. 1 is a schematic view illustrating a structure of a liquid crystal display according to an embodiment of the present invention.
Figure 2A:
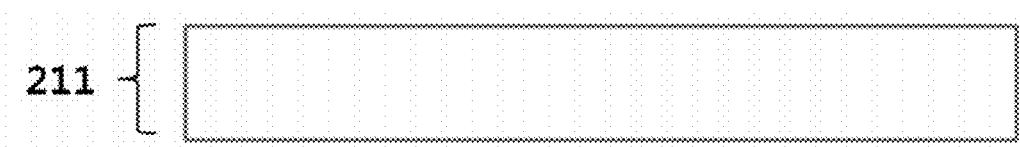
FIGS. 2A to 2D are schematic views respectively illustrating structures of a dual brightness enhancement film, a diffusion sheet, a horizontal prism sheet, and a reflective plate.
Figure 2B:
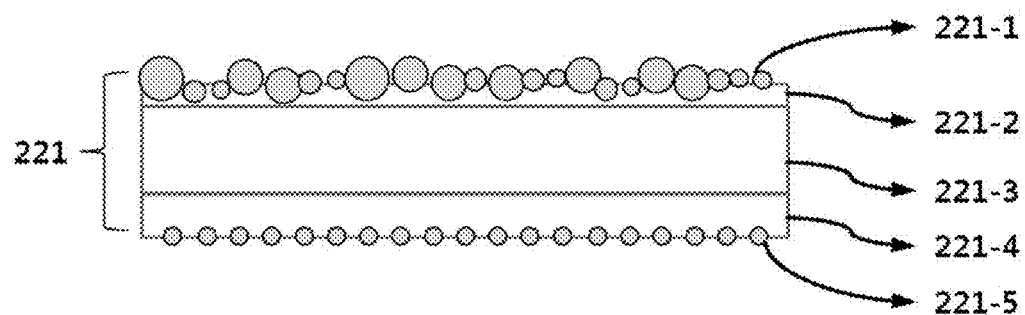
Figure 2C:
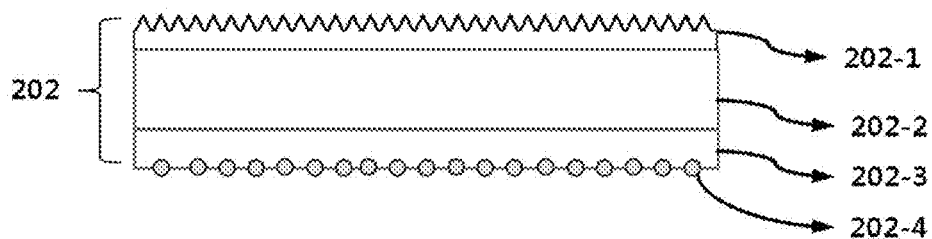
Figure 2D:
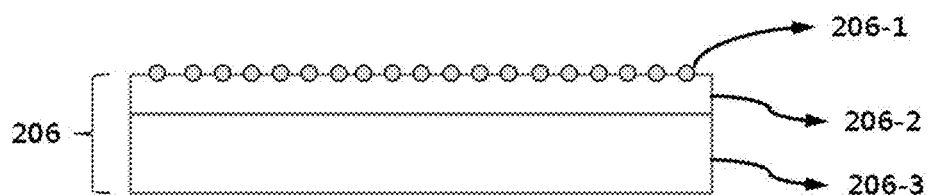

A structure of a liquid crystal display according to an embodiment of the present invention is illustrated in FIG. 1.

Referring to FIG. 1, a liquid crystal panel 10 may comprise an upper polarizing plate 101, a first adhesive layer 102, a liquid crystal cell 103, a second adhesive layer 104, and a lower polarizing plate 105 in a sequentially stacked form, and a backlight unit 20 may sequentially comprise a dual brightness enhancement film (DBEF) 211 or a diffusion sheet 221, a horizontal prism sheet 202, a vertical prism sheet 203, a quantum dot sheet 204, a light guide plate 205, and a reflective plate 206.

Also, referring to FIGS. 2A to 2D, the dual brightness enhancement film 211 may have a multilayer structure (not shown in the drawings), and the diffusion sheet 221 may comprise a diffusion coating layer 221-2 having first beads 221-1 on one side of a diffusion sheet base material 221-3 and may comprise a concealing coating layer 221-4 having second beads 221-5 on the opposite side thereof. Furthermore, the horizontal prism sheet 202 may comprise a prism pattern layer 202-1 on one side of a prism sheet base material 202-2 and may comprise a rear coating layer 202-3 having third beads 202-4 on the opposite side thereof. In addition, the vertical prism sheet 203 may also have the same layer configuration as the horizontal prism sheet 202. Also, the reflective plate 206 may comprise a front coating layer 206-2 having fourth beads 206-1 on one side of a reflective plate base material 206-3.

Figure 3:
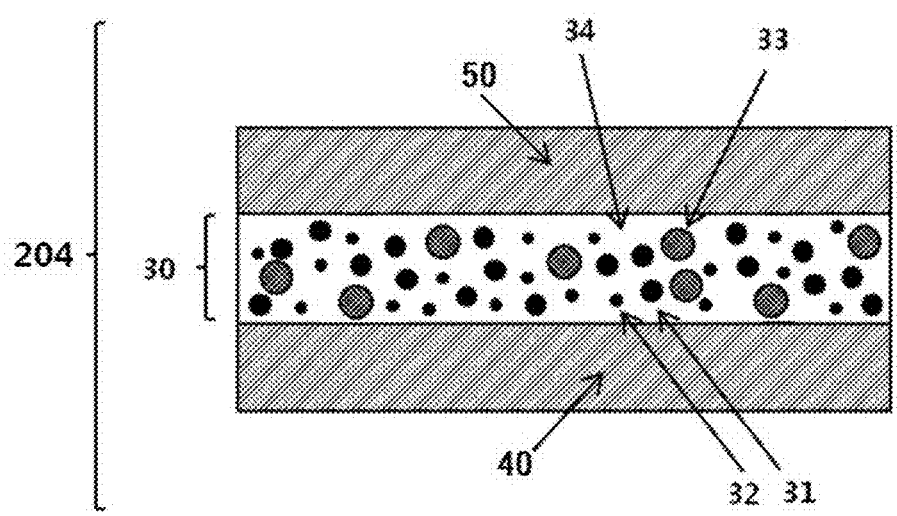
FIG. 3 is a schematic view illustrating a cross-sectional structure of a quantum dot sheet according to an embodiment of the present invention.

Furthermore, referring to FIG. 3, the quantum dot sheet 204 may comprise a first base material layer 40; a second base material layer 50; and a light conversion layer 30 which is formed between the first base material layer and the second base material layer and comprises quantum dot particles (first quantum dot particles 31 and second quantum dot particles 32), a light scattering agent 33, and a polymer resin 34.

However, the liquid crystal display of the present invention is not limited to the above-described structure and may be variously modified if necessary.

When the basic principle of a liquid crystal display is examined, while light emitted from a light source is guided in a direction of a liquid crystal panel through a light guide plate and then passes through a quantum dot sheet, the light is converted to light having a larger wavelength which is emitted to the direction of the liquid crystal panel (upper direction). Since outgoing of the light from the quantum dot sheet in a direction other than a front light exit surface is prevented by passing the light through a prism sheet and light directivity is improved to narrow a viewing angle, brightness in a direction of the front light exit surface of backlight is increased. In this case, if a separate sheet, such as a dual brightness enhancement film, is used in a backlight unit, the increase in the brightness may be maximized by light recycling.

According to the present invention, the backlight unit, the liquid crystal panel, or both of the backlight unit and the liquid crystal panel comprise a coating layer or an adhesive layer comprising at least one type of an absorption dye configured to absorb a specific wavelength band in configurations thereof.

The liquid crystal panel sequentially comprises the upper polarizing plate, the first adhesive layer, the liquid crystal cell, the second adhesive layer, and the lower polarizing plate; and the first adhesive layer, the second adhesive layer, or both of them may comprise at least one type of an absorption dye configured to absorb a specific wavelength band. For example, the adhesive layer may be formed by wet-coating on one side or both sides of the upper polarizing plate or the lower polarizing plate.

A thickness of the adhesive layer may be in a range of 2 μm to 100 μm, 5 μm to 100 μm, or 15 μm to 25 μm.

Also, the adhesive layer may comprise a pressure-sensitive adhesive. For example, the pressure-sensitive adhesive, may comprise at least one adhesive selected from the group consisting of an acryl-based adhesive, a urethane-based adhesive, an epoxy-based adhesive, and a silicon-based adhesive. Specifically, the pressure-sensitive adhesive may be an acryl-based adhesive.

The backlight unit sequentially comprises the dual brightness enhancement film (DBEF) or diffusion sheet, the prism sheet, the quantum dot sheet, the light guide plate, and the reflective plate, and comprises a coating layer on at least one position of one side or both sides of the dual brightness enhancement film or diffusion sheet, one side or both sides of the prism sheet, one side or both sides of the quantum dot sheet, and one side of the reflective plate, wherein the coating layer may comprise at least one type of an absorption dye configured to absorb a specific wavelength band. For example, the coating layer may be formed by wet-coating on one side or both sides of the dual brightness enhancement film or diffusion sheet, one side or both sides of the prism sheet, one side or both sides of the quantum dot sheet, and one side (i.e., light guide plate facing side) of the reflective plate.

The prism sheet may comprise the horizontal prism sheet, the vertical prism sheet, or a combination thereof.

A thickness of the coating layer may be in a range of 1 μm to 100 μm, 2 μm to 100 μm, or 2 μm to 15 μm.

The coating layer may comprise a binder resin. The binder resin, for example, may comprise at least one resin selected from the group consisting of a polyester-based binder resin, an acryl-based binder resin, a polyurethane-based binder resin, a melamine-based binder resin, a polyvinyl alcohol-based binder resin, and an oxazoline-based binder resin. Specifically, the binder resin may be an acryl-based binder resin.

The adhesive layer and/or the coating layer comprising the absorption dye is referred to as a color gamut enhancing film, and, since luminous color gamut and brightness loss of the liquid crystal display may change according to a position of the color gamut enhancing film, particularly a position of the coating layer, the position may be adjusted appropriately, if necessary.

Also, the absorption dye may be a combination of at least one absorption dye having a main absorption wavelength band other than red, green, and blue (RGB). Specifically, the absorption dye may have a main absorption wavelength band of 380 nm to 430 nm, 480 nm to 510 nm, or 560 nm to 600 nm. For example, the absorption dye blocking a wavelength band of 380 nm to 430 nm may comprise a hydroxy benzotriazole (HB)-based absorption dye, a tris-resorcinol-triazine chromophore (TRTC)-based absorption dye, and a hydroxylphenyl-benzotriazole chromophore (HBC)-based absorption dye; the absorption dye blocking a wavelength band of 480 nm to 510 nm may comprise a pyrrole methine (PM)-based absorption dye, a rhodamine (RH)-based absorption dye, and a boron dipyrromethene (BODIBY)-based absorption dye; and the absorption dye blocking a wavelength band of 560 nm to 600 nm may comprise a tetra aza porphyrin (TAP)-based absorption dye, a rhodamine-based absorption dye, a squaraine (SQ)-based absorption dye, and a cyanine (CY)-based absorption dye.

The absorption dye may be selected from the group consisting of a hydroxy benzotriazole (HB)-based dye, a tris-resorcinol-triazine chromophore (TRTC)-based dye, a hydroxylphenyl-benzotriazole chromophore (HBC)-based dye, a pyrrole methine-based dye, a rhodamine-based dye, a boron dipyrromethene-based dye, a tetra aza porphyrin-based dye, a squaraine-based dye, and a cyanine-based dye. Specifically, the absorption dye may be selected from the group consisting of the hydroxy benzotriazole-based dye, the cyanine-based dye, the pyrrole methine-based dye, and the tetra aza porphyrin-based dye. For example, the absorption dye may be a combination of the hydroxy benzotriazole-based dye, the cyanine-based dye, and the tetra aza porphyrin-based dye.

The absorption dye may be comprised in an amount of 0.01 wt % to 10 wt % based on the total weight of the coating layer or the adhesive layer. Specifically, the absorption dye may be comprised in an amount of 0.05 wt % to 7 wt % based on the total weight of the coating layer or the adhesive layer.

The adhesive layer and the coating layer may further comprise an ultraviolet (UV) screening agent for screening UV light. The ultraviolet screening agent absorbs (or blocks) light having a wavelength of 430 nm or less, and, for example, the hydroxy benzotriazole (HB)-based dye, the tris-resorcinol-triazine chromophore (TRTC)-based dye, or the hydroxylphenyl-benzotriazole chromophore (HBC)-based dye may be used alone or in a mixture of two or more thereof.

The adhesive layer and the coating layer may comprise the ultraviolet screening agent in an amount of 0.01 wt % to 10 wt % or 0.05 wt % to 7 wt % based on the total weight of the coating layer or the adhesive layer.

Light transmittance of the adhesive layer and the coating layer may be adjusted according to the brightness range of the liquid crystal display, but, specifically, the adhesive layer and the coating layer may have a visible light transmittance of 30% to 90% or 50% to 90%.

The quantum dot sheet may comprise the first base material layer 40; the second base material layer 50; and the light conversion layer 30 which is formed between the first base material layer and the second base material layer and comprises the quantum dot particles (the first quantum dot particles 31 and the second quantum dot particles 32), the light scattering agent 33, and the polymer resin 34.

The light conversion layer may have a thickness of 10 µm to 200 µm.

The polymer resin 34 may be a thermosetting or ultraviolet-curable polymer resin, and, for example, may comprise at least one selected from the group consisting of a polyester-based resin, a polyurethane-based resin, a polybutadiene-based resin, an acryl-based resin, an epoxy-based resin, a polycarbonate-based resin, a silicon-based resin, a melamine-based resin, and a copolymer thereof. Specifically, the polymer resin may be an ultraviolet-curable polymer resin.

The light conversion layer may comprise the polymer resin in an amount of 50 parts by weight to 95 parts by weight, 80 parts by weight to 95 parts by weight, or 85 parts by weight to 95 parts by weight based on 100 parts by weight of the light conversion layer.

The quantum dot particles 31 and 32 function to convert the wavelength of the light. For example, the quantum dot particles 31 and 32 absorb light and then emit light having a wavelength corresponding to a band gap of the quantum dot. The quantum dot particles, as a spherical nanomaterial, may have an average particle diameter of 2 nm to 10 nm.

The quantum dot particles may be one or more types of quantum dot particles, and when a blue light source is used, the quantum dot particles, for example, may be at least one type of quantum dot particles of the first quantum dot particles 31 emitting green and the second quantum dot particles 32 emitting red. The first quantum dot particles 31 may have a larger diameter than the second quantum dot particles 32. As illustrated in FIG. 3, in a case in which the light conversion layer comprises the first quantum dot particles 31 and the second quantum dot particles 32, light emitted from the light conversion layer may be white light in which red, green, and blue are mixed.

The quantum dot particles may comprise a semiconductor selected from the group consisting of a group II-VI semiconductor, a group III-V semiconductor, a group IV-VI semiconductor, a group IV semiconductor, and a mixture thereof. Also, the quantum dot particles may have a core/shell structure or an alloy structure. The quantum dot particles having the core/shell structure or alloy structure, for example, may comprise CdSe/ZnS, CdSe/ZnSe/ZnS, CdSe/CdS$_x$(Zn$_{1-y}$Cd$_y$)S/ZnS, CdSe/CdS/ZnCdS/ZnS, InP/ZnS, InP/Ga/ZnS, InP/ZnSe/ZnS, PbSe/PbS, CdSe/CdS, CdSe/CdS/ZnS, CdTe/CdS, CdTe/ZnS, CuInS$_2$/ZnS, and Cu$_2$SnS$_3$/ZnS.

The light conversion layer may comprise the quantum dot particles in an amount of 0.1 part by weight to 10 parts by weight, 0.1 part by weight to 5 parts by weight, or 0.2 part by weight to 2 parts by weight based on 100 parts by weight of the light conversion layer.

The light scattering agent 33 may have a spherical shape and may be hollow particles. The light scattering agent may have an average particle diameter of 0.01 µm or more or 0.01 µm to 10 µm. As the light scattering agent, a material having a large difference in terms of refractive index from the polymer resin may be used and the light scattering agent, for example, may comprise at least one selected from the group consisting of BaSO$_4$, ZnO, TiO$_2$, ZrO$_2$, silica, silicon, melamine, polystyrene, and polybutylmethacrylate.

The light conversion layer may comprise the light scattering agent in an amount of 0.1 part by weight to 10 parts by weight or 0.2 part by weight to 5 parts by weight based on 100 parts by weight of the light conversion layer.

In a case in where the average particle diameter and the amount of the light scattering agent are within the above ranges, a decrease in light conversion efficiency by the quantum dot particles for lack of scattering effect may be prevented and desired light transmittance and light conversion performance may be secured.

Also, the first base material layer 40 and the second base material layer 50 are respectively attached to both sides of the light conversion layer and may be attached directly to a surface of the light conversion layer or attached by using an adhesive layer. The first base material layer 40 and the second base material layer 50 may secure stability and reliability of the light conversion layer by maintaining a shape of the quantum dot sheet and effectively blocking the penetration of oxygen and moisture from the outside into the light conversion layer.

Each of the first base material layer and the second base material layer may have a structure comprising a substrate and an inorganic layer (inorganic thin film) formed on a surface of the substrate. Specifically, each of the first base material layer and the second base material layer may further comprise an organic layer (organic polymer thin film) between the substrate and the inorganic layer or on a surface of the inorganic layer. In this case, the inorganic layer or the organic layer of each of the first base material layer and the second base material layer may be in contact with the light conversion layer. The inorganic layer functions to effectively prevent the penetration of oxygen and moisture into the light conversion layer. Since the organic layer formed between the substrate and the inorganic layer may allow the formation of a uniform inorganic layer by flattening the surface of the substrate, the organic layer may further improve a moisture and oxygen blocking performance of the base material layer, and the organic layer formed on the surface of the inorganic layer may increase adhesion with a coating composition for the light conversion layer.

Any substrate may be used without limitation as long as it is an optically transparent plastic substrate, but a polyethylene terephthalate film having high transparency and excellent heat resistance may preferably be used. The substrate may have a light transmittance of 90% or more and a thickness of 50 μm to 350 μm, specifically, 100 μm to 250 μm.

The inorganic layer is formed by depositing an inorganic material on the surface of the substrate, wherein the inorganic material may be selected from oxides, nitrides, and fluorides of metals and non-metals. A specific example of the inorganic material may be at least one selected from the group consisting of aluminum oxide, silicon oxide, silicon nitride, silicon oxynitride, magnesium oxide, indium oxide, and magnesium fluoride. A thickness of the inorganic layer may be in a range of 10 nm to 1 μm.

The organic layer may be formed of a conventional organic polymer material, and a thickness of the organic layer may be in a range of 0.1 μm to 10 μm, particularly 0.3 μm to 7 μm, and more particularly 0.5 μm to 5 μm.

Also, the first base material layer and the second base material layer may comprises an additional coating layer (anti-blocking coating layer or diffusion coating layer) at least one surface not in contact with the light conversion layer, for preventing blocking with one side of another adjacent plate or sheet or increasing the efficiency of the quantum dot particles by a light scattering effect on.

The additional coating layer may comprise a polymer binder and bead particles, and may have a thickness of 0.3 μm to 30 μm. The polymer binder may comprise at least one selected from the group consisting of an acryl-based resin, a urethane-based resin, a silicon-based resin, a polyester-based resin, and a copolymer thereof. The bead particles may be formed of at least one material selected from the group consisting of polymethyl(meth)acrylate, polybutyl (meth)acrylate, polyethylene, polystyrene, polyester, nylon, silicon, and melamine. The bead particles may have an average particle diameter of 0.2 μm to 20 μm.

Component layers of each of the backlight unit and the liquid crystal panel constituting the liquid crystal display of the present invention may have a material, a thickness, and a shape, which are commonly accepted in the art, and may be variously modified if necessary.

A light-emitting diode (LED), as the light source used in the backlight unit of the present invention, may emit light having a wavelength range of 430 nm to 460 nm.

Thus, the liquid crystal display comprising the quantum dot sheet and the color gamut enhancing film of the present invention may provide enhanced color gamut and brightness by blocking unnecessary wavelengths other than pure RGB wavelengths while transmitting the pure RGB wavelengths emitted from a light source to a maximum, and may maximize a color gamut enhancing effect depending on display characteristics by freely changing the position of the color gamut enhancing film.

Detailed Description

Hereinafter, the present invention is further illustrated by the following Examples, but not limited thereto.

PREPARATION EXAMPLE

Preparation of Quantum Dot Sheet 45 parts by weight of lauryl acrylate (EM215, Eternal Chemical) and 10 parts by weight of dipropylene glycol diacrylate (EM222, Eternal Chemical) as an ultraviolet-curable acrylate monomer, 20 parts by weight of aliphatic urethane acrylate (PU2510, Miwon Specialty Chemical Co., Ltd.) and 15 parts by weight of silicon urethane acrylate (SIU1004, Miwon Specialty Chemical Co., Ltd.) as an ultraviolet-curable acrylate oligomer, 5 parts by weight of light scattering agent particles (E+520, Nanogen) having a refractive index of 1.43 and an average particle diameter of 2 μm, and 5 parts by weight of a photoinitiator (TPO, BASF) were mixed to prepare a photocurable resin composition. 5 parts by weight of a quantum dot mixture (Trevista, DOW Chemical), which was composed of an InP/ZnS (core/shell structure) component and produced white light by absorbing blue light and emitting green light and red light from a portion of the blue light, was mixed with 100 parts by weight of the resin composition to prepare a coating composition for a light conversion layer. The viscosity (25° C.) of the coating composition was 0.5 Pa·s.

One surface (inorganic layer surface) of a first base material film (first base material layer) was coated with the coating composition and was then allowed to pass through a gap roll laminator with a second base material film (second base material layer) to be bonded to obtain a thickness of a light conversion layer of 10 μm, and the bonded film was cured by passing through a metal halide ultraviolet curing source to prepare a quantum dot optical sheet. In this case, a film, in which an about 100 nm thick silicon oxide inorganic layer was formed on one surface of a polyethylene terephthalate (PET) substrate (V7200, SKC) by sputtering, was used as each of the first base material film and the second base material film.

Example 1

25 wt % of an acryl binder resin (GS1000 manufactured by Soken) and 75 wt % of methyl ethyl ketone (MEK) were mixed to prepare a solution, and a dye (SK-d593 SK Chemicals, main absorption wavelength band: 560 nm to 600 nm) was then added thereto in an amount of 0.05 part by weight based on 100 parts by weight of the solution to prepare a coating layer composition.

One surface of the quantum dot sheet (QD film) prepared in the preparation example was coated with the coating layer composition by using a mayer bar and dried and cured to form a 5 μm thick coating layer (color gamut enhancing film), and the QD film having the coating layer formed thereon was used in a backlight unit (BLU). The BLU had a structure in which a dual brightness enhancement film, a horizontal prism film, a vertical prism film, the QD film comprising the coating layer formed thereon, and a reflective film were sequentially stacked.

Also, a liquid crystal display was manufactured by using a liquid crystal panel having a structure in which an upper polarizing plate, a first adhesive layer, a liquid crystal cell, a second adhesive layer, and a lower polarizing plate were sequentially comprised (see FIG. 1).

Comparative Example 1

A liquid crystal display was manufactured in the same manner as Example 1, except that the QD film does not comprise the coating layer formed there on.

Experimental Example

Figure 4:
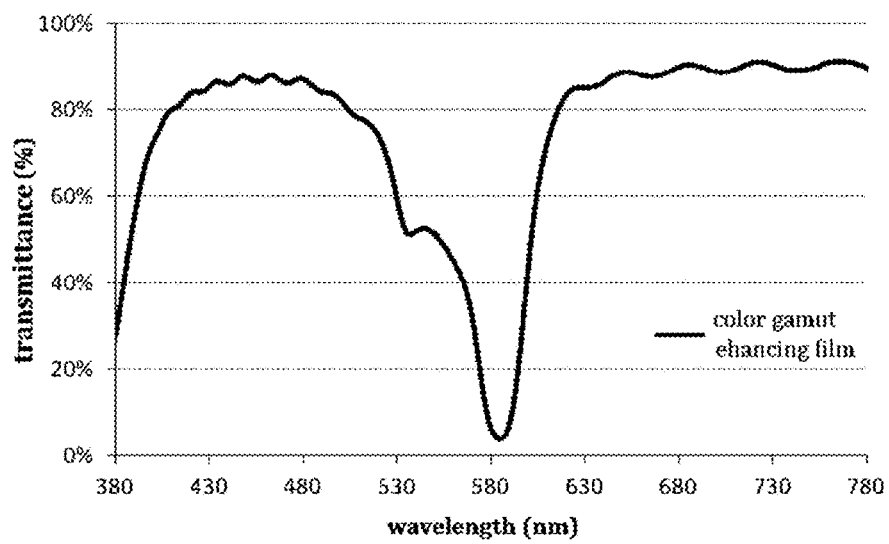
FIG. 4 illustrates a transmission spectrum of a color gamut enhancing film prepared in Example 1.
Figure 5:
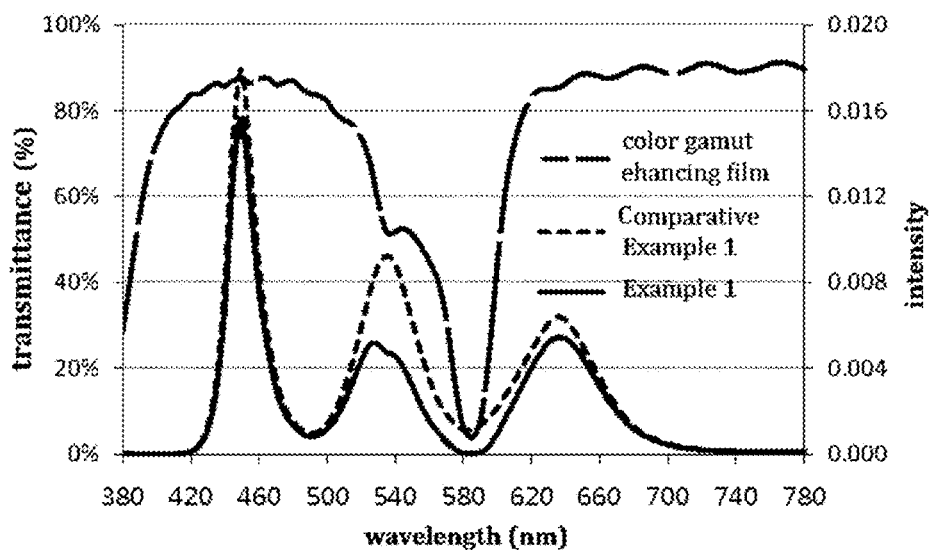
FIG. 5 illustrates emission spectra of films of Example 1 and Comparative Example 1.

Characteristics and changes in spectrum were measured for the liquid crystal displays manufactured in Example 1 and Comparative Example 1 by using a radiometer (CS-2000, Minolta Co., Ltd.) and the results thereof are presented in Table 1 and FIGS. 4 and 5. A color gamut indicates a color reproduction area.

TABLE 1

|  |  | Comparative Example 1 | Example 1 |
|---|---|---|---|
| Full W | x | 0.2769 | 0.2617 |
|  | y | 0.2871 | 0.2285 |
| Full R | x | 0.6769 | 0.6856 |
|  | y | 0.3103 | 0.2997 |
| Full G | x | 0.2633 | 0.2249 |
|  | y | 0.6568 | 0.6547 |
| Full B | x | 0.1518 | 0.1514 |
|  | y | 0.0599 | 0.0512 |
| Full R | u' | 0.5043 | 0.5249 |
|  | v' | 0.5201 | 0.5162 |
| Full G | u' | 0.1017 | 0.0865 |
|  | v' | 0.5708 | 0.5662 |
| Full B | u' | 0.1777 | 0.1828 |
|  | v' | 0.1579 | 0.1392 |
| Color gamut (CIE1931) (based on overlap ratio) | NTSC | 82.4% | 84.4% |
|  | Compared to B12020 | 67.4% | 71.7% |
| Color gamut (CIE1976) (based on overlap ratio) | Compared to NTSC | 87.5% | 89.5% |
|  | Compared to BT2020 | 72.6% | 81.2% |

As illustrated in Table 1 and FIGS. 4 and 5, it may be understood that the liquid crystal display of Example 1 comprising the color gamut enhancing film provides an improved color gamut in comparison with Comparative Example 1.

Explanation of Mark

| | |
|---|---|
| 10: a liquid crystal panel | 101: an upper polarizing plate |
| 102: a first adhesive layer | 103: a liquid crystal cell |
| 104: a second adhesive layer | 105: a lower polarizing plate |
| 20: a backlight unit | |
| 211: a dual brightness enhancement film (DBEF) | |
| 221: a diffusion sheet | 202: a horizontal prism sheet |
| 203: a vertical prism sheet | 204: a quantum dot sheet |
| 205: a light guide plate | 206: a reflective plate |
| 221-1: first beads | 221-2: a diffusion coating layer |
| 221-3: a diffusion sheet base material | |
| 221-4: a concealing coating layer | 221-5: second beads |
| 202-1: a prism pattern layer | 202-2: a prism sheet base material |
| 202-3: a rear coating layer | 202-4: third beads |
| 206: a reflective plate | 206-1: fourth beads |
| 206-2: a front coating layer | 206-3: a reflective plate base material |
| 40: a first base material layer | 50: a second base material layer |
| 31: first quantum dot particles | 32: second quantum dot particles |
| 33: a light scattering agent | 34: a polymer resin |
| 30: a light conversion layer | |

What is claimed is:

1. A liquid crystal display comprising:
   a backlight unit; and
   a liquid crystal panel,
   wherein the backlight unit comprises a quantum dot sheet comprising quantum dot particles, and
   the backlight unit, the liquid crystal panel, or both of the backlight unit and the liquid crystal panel, comprise at least one coating layer or adhesive layer,
   wherein the at least one coating layer or adhesive layer comprises at least one type of an absorption dye configured to absorb a specific wavelength band;
   wherein the backlight unit sequentially comprises a dual brightness enhancement film (DBEF) or a diffusion sheet, a prism sheet, a quantum dot sheet, a light guide plate, and a reflective plate, and
   comprises a coating layer or an adhesive layer on at least one position of one side or both sides of the dual brightness enhancement film or the diffusion sheet, on at least one position of one side or both sides of the prism sheet, on at least one position of one side or both sides of the quantum dot sheet, and also on one side of the reflective plate, wherein the coating layer or the adhesive layer comprises at least one type of an absorption dye configured to absorb a specific wavelength band;
   wherein the absorption dye has a main absorption wavelength band of 380 nm to 430 nm, 480 nm to 510 nm, or 560 nm to 600 nm; and
   wherein the absorption dye is selected from the group consisting of a hydroxy benzotriazole (HB)-based dye, a tris-resorcinol-triazine chromophore (TRTC)-based dye, a hydroxylphenyl-benzotriazole chromophore (HBC)-based dye, a pyrrole methine-based dye, a rhodamine-based dye, a boron dipyrromethene-based dye, a tetra aza porphyrin-based dye, a sguaraine-based dye, and a cyanine-based dye.

2. The liquid crystal display of claim 1, wherein the liquid crystal panel sequentially comprises an upper polarizing plate, a first adhesive layer, a liquid crystal cell, a second adhesive layer, and a lower polarizing plate, and
   the first adhesive layer, the second adhesive layer, or both of them comprise at least one type of an absorption dye configured to absorb a specific wavelength band.

3. The liquid crystal display of claim 1, wherein the absorption dye is selected from the group consisting of the hydroxy benzotriazole-based dye, the cyanine-based dye, the pyrrole methine-based dye, and the tetra aza porphyrin-based dye.

4. The liquid crystal display of claim 3, wherein the absorption dye is a combination of the hydroxy benzotriazole-based dye, the cyanine-based dye, and the tetra aza porphyrin-based dye.

5. The liquid crystal display of claim 1, wherein the absorption dye is comprised in an amount of 0.01 wt % to 10 wt % based on the total weight of the coating layer or the adhesive layer.

6. The liquid crystal display of claim 1, wherein the quantum dot sheet comprises a first base material layer; a second base material layer; and a light conversion layer which is formed between the first base material layer and the second base material layer and comprises the quantum dot particles, a light scattering agent, and a polymer resin.

7. The liquid crystal display of claim 6, wherein the light conversion layer comprises the polymer resin, the quantum dot particles, and the light scattering agent, respectively, in an amount of 50 parts by weight to 95 parts by weight, 0.1 part by weight to 10 parts by weight, and 0.1 part by weight to 10 parts by weight, respectively, based on 100 parts by weight of the light conversion layer.

8. The liquid crystal display of claim 6, wherein the quantum dot particles and the light scattering agent have average particle diameters of 2 nm to 10 nm and 0.01 μm to 10 μm, respectively.

9. The liquid crystal display of claim 6, wherein the first base material layer and the second base material layer comprises a coating layer comprising a polymer binder and bead particles on at least one surface not in contact with the light conversion layer.

* * * * *